US011811832B2

(12) United States Patent
Lahiri et al.

(10) Patent No.: US 11,811,832 B2
(45) Date of Patent: Nov. 7, 2023

(54) QUERYLESS DEVICE CONFIGURATION DETERMINATION-BASED TECHNIQUES FOR MOBILE DEVICE MANAGEMENT

(71) Applicant: Microsoft Technology Licensing, LLC, Redmond, WA (US)

(72) Inventors: Shayak Lahiri, Redmond, WA (US); Richard I. June, Seattle, WA (US); Peter J. Kaufman, Sammamish, WA (US); Yuhang Zhu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/363,988

(22) Filed: Jun. 30, 2021

(65) Prior Publication Data

US 2021/0329038 A1    Oct. 21, 2021

Related U.S. Application Data

(62) Division of application No. 16/037,201, filed on Jul. 17, 2018, now abandoned.

(51) Int. Cl.
*G06Q 10/0635* (2023.01)
*H04W 12/08* (2021.01)
*H04L 9/40* (2022.01)

(52) U.S. Cl.
CPC ....... *H04L 63/205* (2013.01); *G06Q 10/0635* (2013.01); *H04L 63/10* (2013.01); *H04W 12/08* (2013.01)

(58) Field of Classification Search
CPC ... H04L 63/205; H04L 63/10; G06Q 10/0635; H04W 12/08

(Continued)

(56) References Cited

U.S. PATENT DOCUMENTS

| 7,516,478 B2 * | 4/2009 | Limont ............... H04L 67/1095 |
| | | 713/168 |
| 7,546,629 B2 | 6/2009 | Albert et al. |

(Continued)

FOREIGN PATENT DOCUMENTS

| JP | 2010282479 A | 12/2010 |
| JP | 2011530860 A | 12/2011 |

(Continued)

OTHER PUBLICATIONS

"Final Office Action Issued in U.S. Appl. No. 16/051,145", dated Apr. 22, 2020, 11 Pages.

(Continued)

*Primary Examiner* — Farid Homayounmehr

(57) ABSTRACT

Embodiments described herein are directed to managing device compliance for devices that are connected to an enterprise network. For example, a mobile device manager may provide configuration settings to a computing device, which implements the settings in order to be compliant with an enterprise's data and/or security policy. The mobile device manager also maintains a local reference of each device's configuration settings implemented thereby. When the mobile device manager subsequently performs a determination as to whether the computing device is still in compliance, the mobile device manager simply needs to refer to the local reference to determine the computing device's settings instead of explicitly querying the computing device for its settings. The foregoing techniques may be extended for security baseline compliance determinations, IoT device compliance determinations and compliance determinations for other types of devices, such as devices utilized by business partners of the enterprise that utilize the enterprise's network.

20 Claims, 8 Drawing Sheets

(58) Field of Classification Search
USPC .......................................................... 726/1
See application file for complete search history.

(56) References Cited

U.S. PATENT DOCUMENTS

| | | | |
|---|---|---|---|
| 7,644,432 B2 | 1/2010 | Patrick et al. | |
| 8,613,070 B1 | 12/2013 | Deva et al. | |
| 8,997,091 B1 | 3/2015 | Watson et al. | |
| 9,332,424 B2 | 5/2016 | Logan et al. | |
| 9,369,433 B1 | 6/2016 | Paul et al. | |
| 9,420,002 B1 | 8/2016 | Mcgovern et al. | |
| 9,557,983 B1 | 1/2017 | Chan et al. | |
| 9,985,850 B2 * | 5/2018 | Qureshi | H04L 43/04 |
| 10,063,594 B2 * | 8/2018 | Winn | H04L 63/0823 |
| 10,104,710 B1 | 10/2018 | Hodge | |
| 10,382,275 B1 | 8/2019 | Stickle et al. | |
| 10,402,558 B2 | 9/2019 | Bowman et al. | |
| 10,552,823 B1 | 2/2020 | Woodward et al. | |
| 10,776,495 B2 | 9/2020 | Sanossian et al. | |
| 10,810,055 B1 | 10/2020 | Walker | |
| 11,184,223 B2 | 11/2021 | Kaufman et al. | |
| 11,227,032 B1 | 1/2022 | Kraus | |
| 11,243,756 B1 | 2/2022 | Hussain et al. | |
| 2007/0113186 A1 | 5/2007 | Coles et al. | |
| 2007/0143824 A1* | 6/2007 | Shahbazi | H04L 63/102 726/1 |
| 2007/0169093 A1 | 7/2007 | Logan et al. | |
| 2008/0147831 A1 | 6/2008 | Redjaian et al. | |
| 2008/0183800 A1 | 7/2008 | Herzog et al. | |
| 2008/0201705 A1 | 8/2008 | Wookey | |
| 2008/0248788 A1 | 10/2008 | Smith et al. | |
| 2008/0256263 A1 | 10/2008 | Nerst et al. | |
| 2009/0049518 A1 | 2/2009 | Roman et al. | |
| 2009/0204701 A1 | 8/2009 | Herzog et al. | |
| 2010/0037088 A1 | 2/2010 | Krivopaltsev et al. | |
| 2010/0071066 A1 | 3/2010 | Kline et al. | |
| 2010/0205159 A1 | 8/2010 | Li et al. | |
| 2010/0302958 A1 | 12/2010 | Wietfeldt et al. | |
| 2010/0333168 A1 | 12/2010 | Herrod | |
| 2011/0246499 A1 | 10/2011 | Carmel et al. | |
| 2011/0321011 A1 | 12/2011 | Selitser et al. | |
| 2012/0173682 A1* | 7/2012 | Mantere | G06F 9/44505 709/221 |
| 2012/0216242 A1 | 8/2012 | Uner et al. | |
| 2013/0007245 A1* | 1/2013 | Malik | H04L 63/1433 709/223 |
| 2013/0054682 A1 | 2/2013 | Malik et al. | |
| 2013/0103815 A1 | 4/2013 | Ardiri | |
| 2013/0152169 A1 | 6/2013 | Stuntebeck | |
| 2013/0263206 A1 | 10/2013 | Nefedov et al. | |
| 2013/0322329 A1 | 12/2013 | Vsuri et al. | |
| 2014/0019987 A1 | 1/2014 | Verma et al. | |
| 2014/0026179 A1 | 1/2014 | Devarajan et al. | |
| 2014/0064068 A1 | 3/2014 | Horn et al. | |
| 2014/0089985 A1 | 3/2014 | Kawakita et al. | |
| 2014/0109177 A1 | 4/2014 | Barton et al. | |
| 2014/0148140 A1 | 5/2014 | Ahn et al. | |
| 2014/0199987 A1 | 7/2014 | Wright et al. | |
| 2014/0280934 A1 | 9/2014 | Reagan et al. | |
| 2014/0282829 A1 | 9/2014 | Dabbiere et al. | |
| 2014/0344846 A1 | 11/2014 | Yamamura et al. | |
| 2015/0052616 A1 | 2/2015 | Hutchison et al. | |
| 2015/0121506 A1 | 4/2015 | Cavanaugh | |
| 2015/0195182 A1 | 7/2015 | Venkateash et al. | |
| 2015/0207681 A1* | 7/2015 | Limont | H04L 63/10 455/414.3 |
| 2015/0244743 A1 | 8/2015 | Jagad et al. | |
| 2015/0281097 A1 | 10/2015 | Huang et al. | |
| 2015/0296368 A1 | 10/2015 | Kaufman et al. | |
| 2015/0319174 A1 | 11/2015 | Hayton et al. | |
| 2015/0319252 A1 | 11/2015 | Momchilov et al. | |
| 2016/0042010 A1 | 2/2016 | Schuler | |
| 2016/0044531 A1 | 2/2016 | Papa et al. | |
| 2016/0057020 A1 | 2/2016 | Halmstad et al. | |
| 2016/0087854 A1* | 3/2016 | Jayanti Venkata | H04W 16/06 709/224 |
| 2016/0099963 A1 | 4/2016 | Mahaffey et al. | |
| 2016/0119301 A1* | 4/2016 | Thilgen | H04W 12/37 726/1 |
| 2016/0174132 A1 | 6/2016 | Hynes | |
| 2016/0277448 A1 | 9/2016 | Saida et al. | |
| 2017/0026420 A1 | 1/2017 | Balacheff et al. | |
| 2017/0046235 A1 | 2/2017 | Straub et al. | |
| 2017/0048097 A1 | 2/2017 | Kavatage et al. | |
| 2017/0048252 A1 | 2/2017 | Straub et al. | |
| 2017/0064549 A1 | 3/2017 | Rykowski et al. | |
| 2017/0091489 A1 | 3/2017 | Dragone et al. | |
| 2017/0118246 A1 | 4/2017 | Murthy et al. | |
| 2017/0201590 A1 | 7/2017 | Wojciechowski et al. | |
| 2017/0269954 A1 | 9/2017 | Hardy | |
| 2017/0329966 A1 | 11/2017 | Koganti et al. | |
| 2017/0332238 A1 | 11/2017 | Bansal et al. | |
| 2017/0339564 A1 | 11/2017 | Momchilov et al. | |
| 2018/0004930 A1 | 1/2018 | Csinger et al. | |
| 2018/0063088 A1 | 3/2018 | Hardy | |
| 2018/0121659 A1 | 5/2018 | Sawhney et al. | |
| 2018/0131685 A1 | 5/2018 | Sridhar et al. | |
| 2018/0131751 A1 | 5/2018 | Jones | |
| 2018/0157457 A1 | 6/2018 | Paramashivaiah et al. | |
| 2018/0176254 A1 | 6/2018 | Lam et al. | |
| 2018/0270328 A1 | 9/2018 | Agarwal et al. | |
| 2018/0288045 A1 | 10/2018 | Karunakaran et al. | |
| 2018/0293066 A1 | 10/2018 | Ali et al. | |
| 2018/0337951 A1 | 11/2018 | Agarwal et al. | |
| 2018/0365043 A1* | 12/2018 | Kaufman | G06F 11/3672 |
| 2019/0124401 A1 | 4/2019 | Lentner | |
| 2020/0007396 A1 | 1/2020 | Fainberg et al. | |
| 2020/0034141 A1* | 1/2020 | Bilal | G06F 9/4451 |
| 2020/0044916 A1 | 2/2020 | Kaufman et al. | |
| 2020/0167303 A1 | 5/2020 | Kim et al. | |
| 2021/0351978 A1 | 11/2021 | Kaufman et al. | |

FOREIGN PATENT DOCUMENTS

| | | |
|---|---|---|
| JP | 2014506363 A | 3/2014 |
| JP | 2014529154 A | 10/2014 |
| JP | 2015099579 A | 5/2015 |
| JP | 2017518594 A | 7/2017 |
| WO | 2006034407 A2 | 3/2006 |
| WO | 2017172818 A1 | 10/2017 |

OTHER PUBLICATIONS

"Final Office Action Issued in U.S. Appl. No. 16/051,145", dated Jan. 14, 2021, 11 Pages.

"Non Final Office Action Issued in U.S. Appl. No. 16/051,145", dated Aug. 19, 2020, 10 Pages.

"Non Final Office Action Issued in U.S. Appl. No. 16/051,145", dated Jan. 22, 2020, 8 Pages.

"Notice of Allowance Issued in U.S. Appl. No. 16/051,145", dated Jul. 21, 2021, 16 Pages.

"Non Final Office Action Issued in U.S. Appl. No. 17/384,178", dated Jul. 19, 2022, 12 Pages.

"Office Action Issued in Indian Patent Application No. 202047054855", dated Oct. 20, 2022, 7 Pages.

"International Search Report and Written Opinion Issued in PCT Application No. PCT/US19/39507", dated Oct. 16, 2019, 13 Pages.

"Office Action Issued in Indian Patent Application No. 202047057043", dated Oct. 12, 2022, 7 Pages.

"Final Office Action Issued in U.S. Appl. No. 17/384,178", dated Dec. 20, 2022, 13 pages.

"Notice of Allowance Issued in European Patent Application No. 19740112.8", dated Mar. 13, 2023, 7 Pages.

"Notice of Allowance Issued in U.S. Appl. No. 17/384,178", dated Apr. 19, 2023, 10 Pages.

"Office Action Issued in Japanese Patent Application No. 2021-505190", dated Jun. 1, 2023, 9 Pages.

"Office Action Issued in Japanese Patent Application No. 2021-502498", dated Jul. 27, 2023, 8 Pages.

(56) References Cited

OTHER PUBLICATIONS

"Decision to grant Issued in European Patent Application No. 19740112.8", dated Jul. 27, 2023, 2 Pages.

* cited by examiner

QUERYLESS DEVICE CONFIGURATION DETERMINATION-BASED TECHNIQUES FOR MOBILE DEVICE MANAGEMENT

CROSS-REFERENCE TO RELATED APPLICATION(S)

The present application is a divisional application of U.S. application Ser. No. 16/037,201, filed on Jul. 17, 2018, and entitled "QUERYLESS DEVICE CONFIGURATION DETERMINATION-BASED TECHNIQUES FOR MOBILE DEVICE MANAGEMENT," the entirety of which is incorporated by reference herein.

BACKGROUND

Mobile device management (MDM) is a way to ensure employees stay productive and do not breach corporate policies. Many organizations control activities of their employees using MDM products/services. MDM primarily deals with corporate data segregation, securing emails, securing corporate documents on devices, enforcing corporate policies, and integrating and managing mobile devices, including laptops and handhelds of various categories. By controlling and protecting the data and configuration settings of all mobile devices in an organization's network, MDM can reduce support costs and business risks.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments described herein are directed to managing device compliance for devices that are connected to a network, for example, an enterprise network. For instance, a mobile device manager may provide configuration settings to a computing device, which implements the settings in order to be compliant with an enterprise's policy (e.g., a data and/or security policy). The mobile device manager also maintains a local reference of each device's configuration settings implemented thereby. When the mobile device manager subsequently performs a determination as to whether the computing device remains in compliance, the mobile device manager simply needs to refer to the local reference to determine the computing device's settings instead of explicitly querying the computing device for its settings. The foregoing techniques may be extended for security baseline compliance determinations, internet-of-things (IoT) device compliance determinations and compliance determinations for other types of devices, such as devices utilized by business partners of the enterprise that utilize the enterprise's network.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Figure 1:
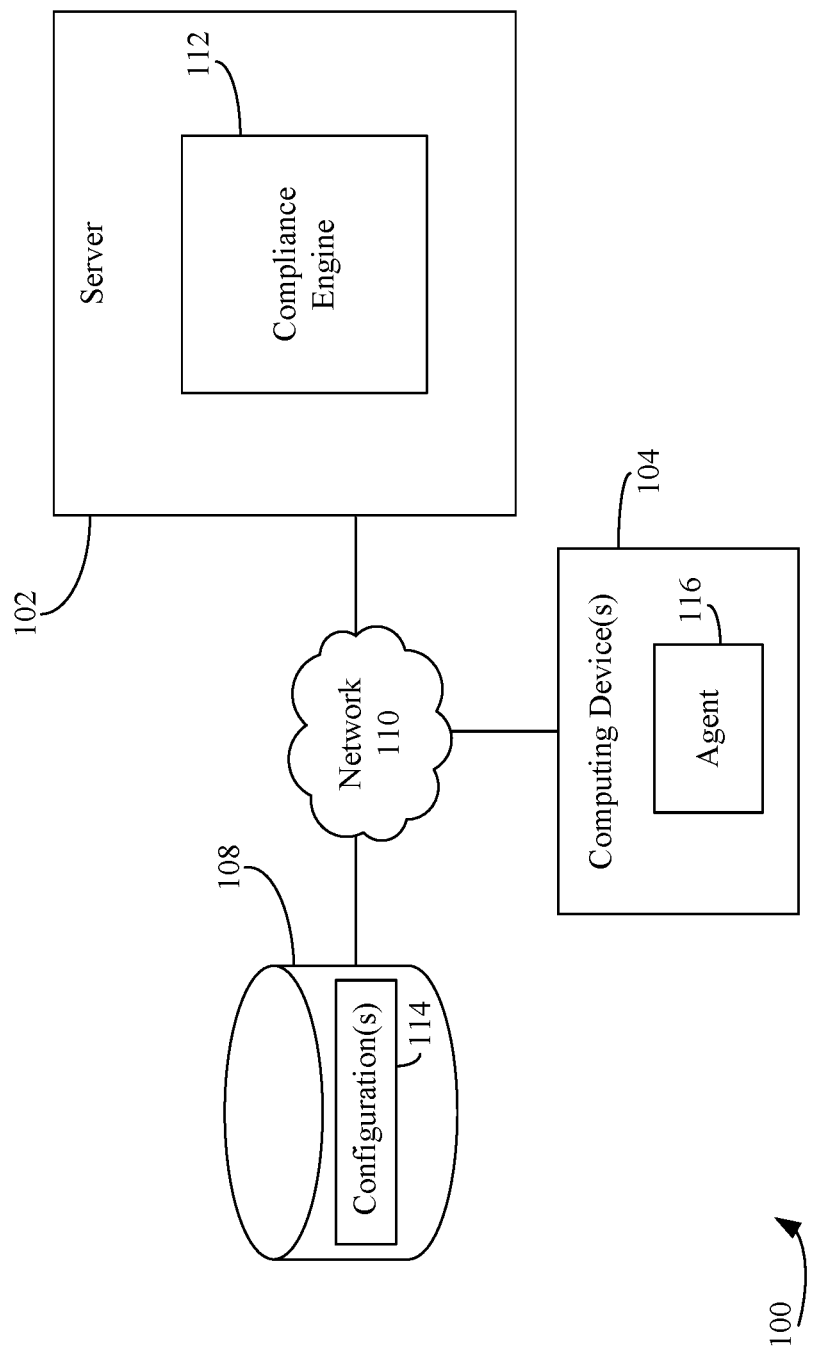
FIG. 1 depicts a block diagram of a system for managing device compliance in accordance with an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. System and Method for Managing Device Compliance

Embodiments described herein are directed to managing device compliance for devices that are connected to a network, for example, an enterprise network. For instance, a mobile device manager at a server may provide configuration settings to a computing device, which implements the settings in order to be compliant with an enterprise's policy (e.g., a data and/or security policy). The mobile device manager also maintains a local reference of each device's configuration settings implemented thereby. When the mobile device manager subsequently performs a determination as to whether the computing device remains in compliance, the mobile device manager simply needs to refer to the local reference to determine the computing device's settings instead of explicitly querying the computing device for its settings. The foregoing techniques may be extended for security baseline compliance determinations, internet-of-things (IoT) device compliance determinations and compliance determinations for other types of devices, such as devices utilized by business partners of the enterprise that utilize the enterprise's network.

The foregoing techniques establish a trust between the mobile device manager and the computing devices (i.e., a device trust), where the devices are expected to maintain their configuration settings and notify the mobile device manager if such settings are changed. Thus, the local reference is always reflective of a particular device's configuration settings, thereby enabling the mobile device manager to determine a device's configuration settings without querying the device. Such a technique is more reliable than querying the device for its settings, as both the queries and the responses to those queries provided by the devices are susceptible to error (e.g., transmission errors).

Furthermore, because compliance checks are performed without having to query a computing device for its configuration settings, network traffic across the enterprise's network is advantageously reduced, thereby freeing up network bandwidth. Moreover, a lesser amount of computing resources of the computing device is utilized and lower power consumption is achieved with such techniques, as the computing device is no longer required to respond to numerous configuration queries from the mobile device manager.

Still further, the foregoing techniques provide improvements to other technologies, namely mobile device management. That is, the queryless technique described above results in much faster compliance checks because the local reference of the configuration settings is consulted to determine a device's settings, rather than having to wait for the device to respond to the configuration setting query over the network.

FIG. 1 is a block diagram of a system 100 for managing device compliance in accordance with an embodiment. As shown in FIG. 1, system 100 includes a server 102, one or more computing devices 104, and one or more data stores 108 communicatively coupled via an enterprise network 110. Data store(s) 108 may comprise one or more physical memory and/or storage device(s). Data store(s) 108 may be any type of physical memory and/or storage device that is described herein, and/or as would be understood by a person of skill in the relevant art(s) having the benefit of this disclosure. Enterprise network 110 comprises a private computer network established by an enterprise for the purposes of interconnecting enterprise devices (e.g., computing device(s) 104) at one or more enterprise locations to other enterprise devices and to enable enterprise devices to access and/or share computing resources.

Computing device(s) 104 are intended to represent devices utilized by or otherwise accessible to members (e.g., employees) of an enterprise. As used herein, the term "enterprise" broadly refers to any of a wide variety of organization types, including businesses, non-profit organizations, and government agencies. Users of computing device(s) 104 may be referred to herein as "enterprise users" or simply "users". Each of computing device(s) 104 may comprise, for example and without limitation, a desktop computer, a laptop computer, a tablet computer, a netbook, a smartphone, or the like. Additional examples of computing device(s) 104 are described below with reference to FIGS. 7 and 8.

Data store(s) 108 are configured to store one or more configurations 112 for computing device(s) 104. Each of configuration(s) 114 may specify one or more configuration settings for a particular computing device of computing device(s) 104 and/or a particular user of each of computing device(s) 104. Thus, each of computing device(s) 104 may be associated with more than one of configuration(s) 114. For example, a first configuration of configuration(s) 114 may be associated with a first user of a particular computing device, and a second configuration of configuration(s) 114 may be associated with a second user of the particular computing device. A configuration and a particular user of a particular computing device that the configuration corresponds to is herein referred to as a user-device pair. Examples of configuration settings include, but are not limited to, an encryption setting to be implemented by computing device(s) 104, a security setting to be implemented by computing device(s) 104, a minimum version of at least one of an application or an operating system required to be installed on computing device(s) 104, etc. The encryption setting(s) may specify whether a storage device included in computing device 104 is to be encrypted (e.g., via an encryption program, such as, but not limited to BitLocker™). The security settings may specify a password policy to be implemented by computing device 104 (e.g., setting the password length to a minimum of 10 characters, 12 characters, etc.), whether code signing should be implemented by computing device(s) 104, whether a trusted platform module (TPM) should be implemented by computing device(s) 104, etc. It is noted that the configuration settings described above are purely exemplary and that other configuration settings may be used.

Server 102 may be configured to manage compliance of computing device(s) 104 with respect to a policy (e.g., a data and/or security policy) specified by the enterprise. Server 102 may also be referred to as a mobile device manager. The policy may be specified in accordance with one or more compliance rule(s). For instance, server 102 may comprise a compliance engine 112. Compliance engine 112 may determine configuration(s) 114 to be provided to a particular computing device of computing device(s) 104 and provide the determined configuration(s) thereto. The determined configuration(s) may comply with compliance rule(s). The compliance rule(s) may be specified by an administrator of the enterprise (e.g., an IT administrator or other person within an enterprise who may be responsible for deploying, maintaining and/or configuring computing device(s) 104 on behalf of enterprise users). Each of computing device(s) 104 is configured to implement the configuration setting(s) specified by configuration(s) 114 and provide an acknowledgment to server 102. The acknowledgment indicates that the computing device has implemented the configuration settings. Upon receiving the acknowledgment, compliance engine 112 designates the computing device from which the acknowledgment was received as being in compliance with the compliance rule(s).

Compliance engine 112 may be further configured to maintain a local reference of the configuration setting(s) implemented by each of computing device(s) 104. Compliance engine 112 may be configured to determine whether a particular computing device of computing device(s) 104 remains in compliance with the compliance rule(s) using the reference. By doing so, compliance engine 112 simply needs to access the reference to determine the configuration setting(s) implemented by computing device(s) 104 rather than having to query computing device(s) 104 for its configuration settings.

Figure 2:
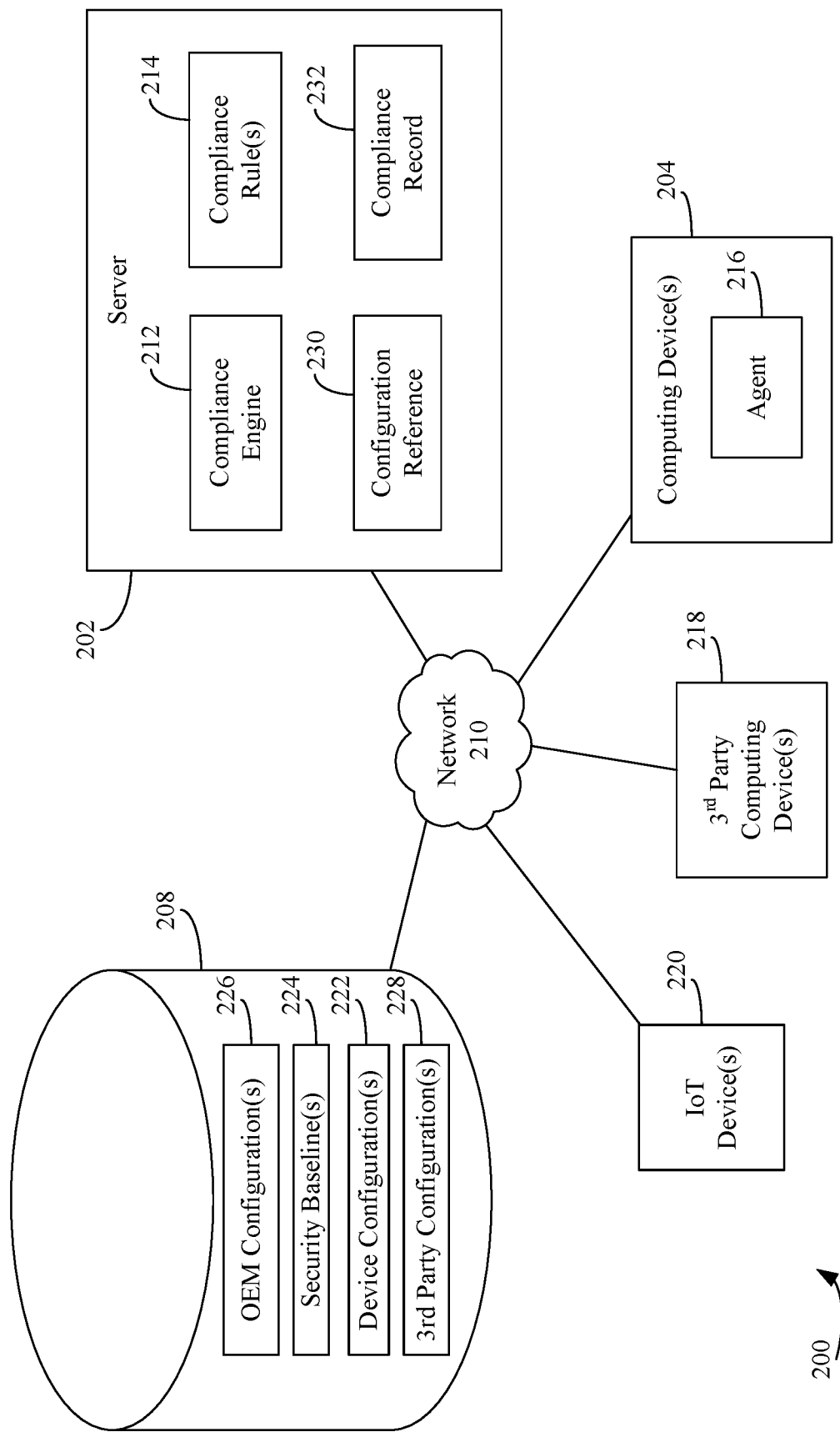
FIG. 2 depicts a block diagram of a system for managing device compliance, that is a further detailed example of the system of FIG. 1, in accordance with an example embodiment.

System 100 of FIG. 1 may be implemented in various ways, in embodiments. For instance, FIG. 2 depicts a detailed block diagram of system 200, according to an example embodiment. System 200 is an example of system 100. As shown in FIG. 2, system 200 includes server 202, computing device(s) 204, data store(s) 208, third party computing device(s) 218, and Internet-of-Things (IoT) device(s) 220, each of which are communicatively coupled via enterprise network 210. Server 202, computing device(s) 204, data store(s) 208, and enterprise network 210 are examples of server 102, computing device(s) 104, data store(s) 208, and enterprise network 110, as respectively described above with reference to FIG. 1.

Data store(s) 208 are configured to store a plurality of different configurations for a plurality of different types of devices. For example, as shown in FIG. 2, data store(s) 208 may store device configuration(s) 222, third party configuration(s) 228, and original equipment manufacturer (OEM) configuration(s) 226. Device configuration(s) 222 may specify one or more configuration settings for computing device(s) 204 and/or a particular user of computing device(s) 204. OEM configuration(s) 226 may specify configuration setting(s) for IoT device(s) 220, and third-party configuration(s) 228 may specify configuration setting(s) for third party computing device(s) 218. Data store(s) 208 may also store security baseline(s) 224, which may specify configuration settings for device(s) (such as computing device(s) 204, third party computing device(s) 218, and/or IoT device(s) 220) that a software developer (e.g., an operating system (OS) developer) recommends in order keep such device(s) secure. Each of device configuration(s) 222, third party configuration(s) 228, OEM configuration(s) 226, and security baseline(s) 224 may be stored as a file (e.g., an XML file, a text file, etc.). Additional details regarding device configuration(s) 222, third party configuration(s) 228, OEM configuration(s) 226, and security baseline(s) 224 are described below.

Device configuration(s) 222 may specify configuration setting(s) for computing device(s) 204, which are computing device(s) that are maintained by the enterprise and provisioned to employees of the enterprise. Device configuration(s) 222 may be specified by an administrator of the enterprise (e.g., via a graphical user interface (GUI)). Device configuration(s) 222 are specified in accordance with one or more compliance rule(s) 214 maintained by server 202. Compliance rule(s) 214 may also be specified by an administrator of the enterprise (e.g., via a GUI). Compliance rule(s) 214 may specify the configuration setting(s) that should be utilized by device(s) connected to enterprise network 210 (e.g., computing device(s) 204, third party computing device(s) 218, and IoT device(s) 220) in order to comply with a policy specified by the enterprise.

Server 202 may be configured to determine a device configuration(s) 222 to be provided to computing device(s) 204 and provide the determined configuration(s) thereto. For example, when a user first logs into a computing device newly provisioned thereto, server 202 may retrieve device configuration(s) 222 associated with that computing device and/or user and provide device configuration(s) 222 to the computing device. As shown in FIG. 2, each of computing device(s) 204 may be configured to execute an agent 216, which is configured to implement the configuration settings specified by the received device configuration. After implementing the settings, agent 216 may provide an acknowledgment to compliance engine 212. The acknowledgment indicates that computing device 204 has implemented the configuration settings. Upon receiving the acknowledgment, compliance engine 212 designates the computing device as being in compliance with compliance rule(s) 214.

Server 204 may maintain a compliance record 232 that includes a designation for each user-device pairing as to whether the particular user-device pairing is in compliance. For example, compliance record 232 may comprise a data structure (e.g., a table) comprising a plurality of entries, where each entry specifies a particular user-device pair, and an indication as to whether that user-device pair is compliance. Server 202 may be further configured to maintain a local configuration reference 230 of the configuration settings implemented for each user-device pairing. Configuration reference 230 may comprise a data structure (e.g., a table) comprising a plurality of entries, where each entry specifies a particular user-device pair and the configuration settings implemented by that pair. It is noted that the structure and/or organization of configuration reference 230 and/or compliance record 232 described above is purely exemplary and that other structures and/or organizations may be used.

Compliance engine 212 may be configured to determine whether computing device(s) 204 remain in compliance with compliance rules using reference 230. By doing so, compliance engine 212 simply needs to access reference 230 to determine the configuration settings implemented by computing device(s) 204, rather than having to query computing device(s) 204 for their configuration settings. Compliance engine 212 may determine whether computing device(s) 204 remain in compliance upon detecting a triggering event.

In accordance with an embodiment, the triggering event is an expiration of a predetermined time period. In accordance with such an embodiment, compliance engine 212 may periodically compare compliance rule(s) 214 to the configuration settings of computing device(s) 204. Over time, compliance rule(s) 214 may be modified by an administrator of the enterprise. Accordingly, compliance engine 212 may periodically determine whether the configuration settings implemented by computing device(s) 204 comply with compliance rule(s) 214 by using reference 230. For example, compliance engine 212 may look up the configuration setting(s) utilized by computing device(s) 204 using reference 230 and compare the configuration setting(s) to compliance rule(s) 214 to determine whether they comply. If the compliance setting(s) do not comply with the compliance rule(s) 214, compliance engine 212 may determine that computing device(s) 204 are no longer in compliance. If the compliance setting(s) do comply with compliance rule(s) 214, compliance engine 212 may determine that computing device(s) 204 remain in compliance.

In accordance with another embodiment, the triggering event is an indication from computing device(s) 204 that a configuration setting thereof has changed. For example, a user of a particular computing device of computing device(s) 204 and/or an application executing on computing device(s) 204 may alter a configuration setting. Agent 216 may be configured to provide a notification to compliance engine 212 in response to a configuration setting being changed. The notification may specify which settings were changed. Upon receiving the notification from a particular computing device, compliance engine 212 determines whether the changed settings cause the particular computing device to be no longer be in compliance with compliance rule(s) 214. For example, compliance engine 212 may compare the configuration setting(s) indicated in the notification to compliance rule(s) 214 to determine whether the changed settings comply therewith. If the configuration setting(s) comply with compliance rule(s) 214, compliance engine 212 may determine that the particular computing device remains in compliance.

If the configuration setting(s) do not comply with compliance rule(s) 214, compliance engine 212 may determine that the particular computing device is no longer in compliance and update the designation for the computing device in compliance record 232 to indicate that the computing device is no longer compliant. Compliance engine 212 may also prevent such computing device(s) from accessing a resource accessible via enterprise network 210. Such resources include, but are not limited to an email server, a data repository, an application server, etc. Access to such resources may be prevented until computing device(s) 204 are in compliance with the compliance rule(s) 214. For instance, compliance engine 212 may transmit a new configuration setting that is in compliance with compliance rule(s) 214. Upon implementing the new configuration setting(s), agent 216 may transmit an acknowledgment to compliance engine 212. Upon receiving acknowledgment, compliance engine 212 may designate computing device(s) 204 as being in compliance and update compliance record 232 accordingly.

In accordance with an embodiment, agent 216 is configured to maintain the configuration settings provided by server 202. For example, in the event that a user or an application executing on computing device(s) attempts to change a configuration setting, agent 216 may prevent the change from occurring and/or rollback the change. In the event that agent 216 is unable to prevent and/or rollback the configuration setting, agent 216 may send the notification indicating the changed setting(s) to compliance engine 212.

In accordance with a further embodiment, the triggering event is an indication that a user has logged into enterprise network 210 via a computing device (e.g., computing device(s) 204). For example, the computing device may be configured to provide a notification to server 202 in response to a user logging into the computing device. Upon receiving notification, compliance engine 212 may look up the configuration setting(s) utilized by computing device(s) 204 for the logged-in user (i.e., for the user-device pair) using reference 230 and compare the configuration setting(s) to compliance rule(s) 214 to determine whether they comply. If the compliance setting(s) do not comply with the compliance rule(s) 214, compliance engine 212 may determine that computing device(s) 204 are no longer in compliance. If the compliance setting(s) do comply with compliance rule(s) 214, compliance engine 212 may determine that computing device(s) 204 remain in compliance. The foregoing enables compliance engine 212 to enforce compliance on a user-device pair without having to always push down configuration setting(s) every time a user logs onto a particular device. This ensures that compliance in multi-user environments can be immediate when compliance is being evaluated on a per user basis. For example, when a different user logs into a device, compliance engine 212 can simply determine the configuration setting(s) that are already implemented for that user-device pair by accessing reference 230 to the configuration settings stored by server 202 and determine whether any differences exist between the configuration settings already implemented by the device and compliance rule(s) 214. If there are no differences, the device is immediately designated as being compliant in compliance record 232. The foregoing is achieved without server 202 having to re-query the device for its current configuration setting(s). In contrast, prior techniques required a server to push down user-specific settings to the device each time a user logs on and subsequently query the device for its settings. The server would then then have to designate the device as being compliant after comparing the settings received from the device to the compliance rule(s). The foregoing techniques eliminates this back and forth communication completely if the existing settings already implemented by the device are in compliance with compliance rule(s) 214.

If there are differences, compliance engine 212 may update the designation in compliance record 232 for such computing device(s) 204 to indicate that such device(s) are no longer in compliance. Compliance engine 212 may also prevent such computing device(s) 204 from accessing a resource accessible via enterprise network 210. Such resources include, but are not limited to an email server, a data repository, an application server, etc. Access to such resources may be prevented until computing device(s) 204 are in compliance with the compliance rule(s) 214. For instance, compliance engine 212 may transmit a new configuration setting that is in compliance with compliance rule(s) 214. Upon implementing the new configuration setting(s), agent 216 may transmit an acknowledgment to compliance engine 212. Upon receiving acknowledgment, compliance engine 212 may designate computing device(s) 204 as being in compliance by updating compliance record 232 accordingly.

The foregoing advantageously enables compliance engine 212 to determine compliance upon receiving the acknowledgment from computing device(s) 204, rather than having to re-query the device for its settings. This advantageously prevents non-compliant users to temporarily have access to network resources. In prior techniques, users would still have access to network resources while the server queried the computing device for its configuration settings and compared the settings to the compliance rules. The techniques disclosed herein prevent this by immediately checking for compliance upon receiving the acknowledgment from agent 216. Furthermore, these techniques improve user experience when a compliant user logs onto a device being used by a different non-compliant user. In prior techniques, when a compliant user logs onto the device, the device would be marked as non-compliant while the server queried the device for its configuration settings. The techniques disclosed herein eliminate this issue by immediately checking for compliance using reference 230 upon a new user logging on to the device.

In accordance with yet another embodiment, the triggering event is an indication that compliance rule(s) 214 have changed. For example, when an administrator makes a change to compliance rule(s) 214, compliance engine 212 may receive an indication indicative of the change. Upon receiving the indication, compliance engine 212 may look up the configuration setting(s) utilized by computing device(s) 204 using reference 230 and compare the configuration setting(s) to compliance rule(s) 214 to determine whether they comply. If the configuration setting(s) comply with compliance rule(s) 214, compliance engine 212 may determine that the particular computing device remains in compliance.

If the configuration setting(s) do not comply with compliance rule(s) 214, compliance engine 212 may determine that the particular computing device is no longer in compliance and update the designation for the computing device in compliance record 232 to indicate that the computing device is no longer compliant. Compliance engine 212 may also prevent such computing device(s) from accessing a resource accessible via enterprise network 210 until such computing device(s) become compliant.

Security baseline(s) 224 may be periodically published and released by operating system (OS) developers as a part of each OS release and are a part of the compliance criteria for many enterprises. In a conventional scenario, an enterprise needs to re-query computing devices and re-evaluate compliance for all user-device pairs in their organization through each OS update. This is a very expensive process for enterprises and blocks faster adoption of the OS. To overcome such issues, when new security baseline(s) 224 are released for a new OS update, compliance engine 212 may query data store(s) 208 for security baseline(s) 224 for new OS versions/updates (or use their own enterprise-specific baseline) and evaluate whether the new OS version/update has kept the users on the device compliant. For example, compliance engine 212 may look up the configuration setting(s) utilized by each user-device pair using reference 230 and compare the configuration setting(s) to security baseline(s) 224 to determine whether they comply. If the configuration setting(s) do not comply with security baseline(s) 224, compliance engine 212 determines that the user-device pair is not compliant. In response, compliance engine 212 may designate the user-device pair as being non-compliant, prevent access to enterprise resource(s), and/or provide updated configuration setting(s) to the associated computing device. If the compliance setting(s) do comply with security baseline(s) 224, compliance engine 212 determines that the user-device pair is compliant. The foregoing technique allows compliance to be evaluated immediately without requiring each user to log in to a particular device.

IoT device(s) 220 may be classified as being secure by default and have default configurations configured by the manufacturer (also referred to as the OEM) of such devices. Examples of IoT device(s) 220 include, but are not limited to, video conferencing systems, printers, speakers, heating, ventilation and air conditioning (HVAC) systems, etc. Configurations for such devices may be stored in data store(s) 208 (shown as OEM configuration(s) 226). Configuration settings of IoT device(s) 220 are generally not modifiable by the end-user and/or only modifiable by the OEM (e.g., via a software and/or hardware update). To determine whether IoT device(s) 220 are in compliance, compliance engine 212 may query data store(s) 208 for OEM configuration(s) 226 and compare OEM configuration(s) 226 for each of IoT device(s) 220 utilized by the enterprise to compliance rule(s) 214 to determine whether they comply. If IoT device(s) 220 are not in compliance, the organization may notify the manufacturer to update the configuration settings of such device(s) so that they are in compliance. If IoT device(s) 220 comply with compliance rule(s), compliance engine 212 may designate such device(s) as being compliant in compliance record 232.

In the event that the OEM changes the configuration settings of the device via an update, the OEM may provide updated OEM configuration(s) 226 to the enterprise, and compliance engine 212 may re-evaluate compliance. This advantageously enables compliance engine 212 to batch process IoT device(s) 220 using OEM configuration(s) 226, rather than having to evaluate each of IoT device(s) 220 by individually querying each device for its configuration.

Configuration settings may also be provided by third party entities. For example, as shown in FIG. 2, third party configuration(s) 228 specify configuration settings for third party computing device(s) 218, which may be device(s) associated with business partners of the enterprise. For example, employees of such partners may visit the enterprise for business purposes. Third party computing device(s) 218 may be checked for compliance using third party configuration(s) 228. The third party may provide third party configuration(s) 228 to the enterprise before employees of the third party arrive at the enterprise's site, and compliance engine 212 may determine whether third party computing device(s) 218 are in compliance with compliance rule(s) 214 before arrival. If third party computing device(s) 218 are not in compliance, the enterprise may notify the third party that changes are required to the configuration of their devices and inform them of the required configuration settings. The third party may update the configuration settings accordingly and provide updated third-party configuration(s) 228 to the enterprise. Compliance engine 218 may then reevaluate compliance using updated third-party configuration(s) 228 and notify the third-party if third party computing device(s) 218 are now in compliance. This advantageously enables third party computing device(s) 218 to have access to enterprise network 210 and its resources immediately upon arrival, rather than having to wait for the enterprise to manage their device and evaluate compliance after third party computing device(s) 218 connects to enterprise network 210.

Figure 3:
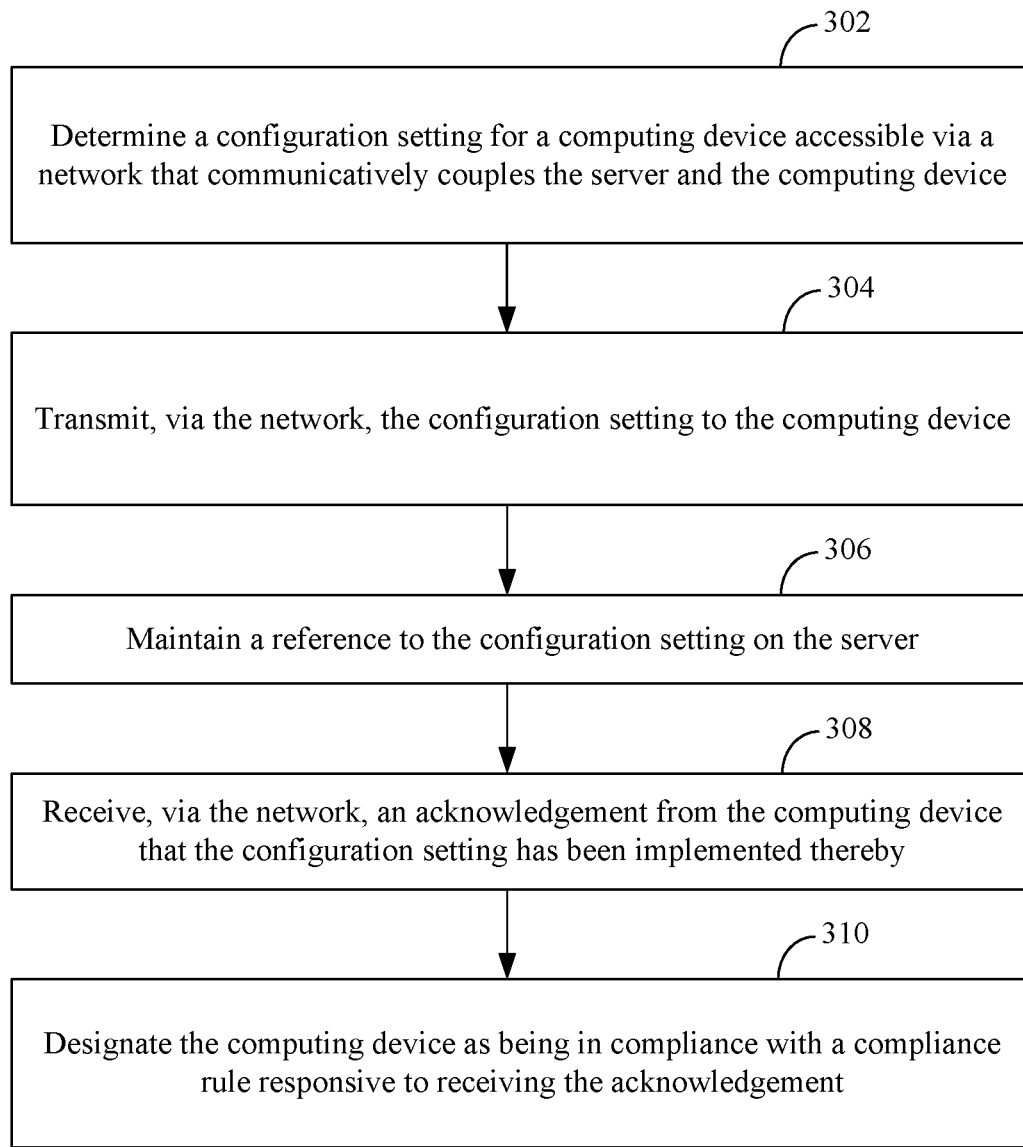
FIG. 3 depicts a flowchart of an example method for managing device compliance in accordance with an example embodiment.
Figure 4:
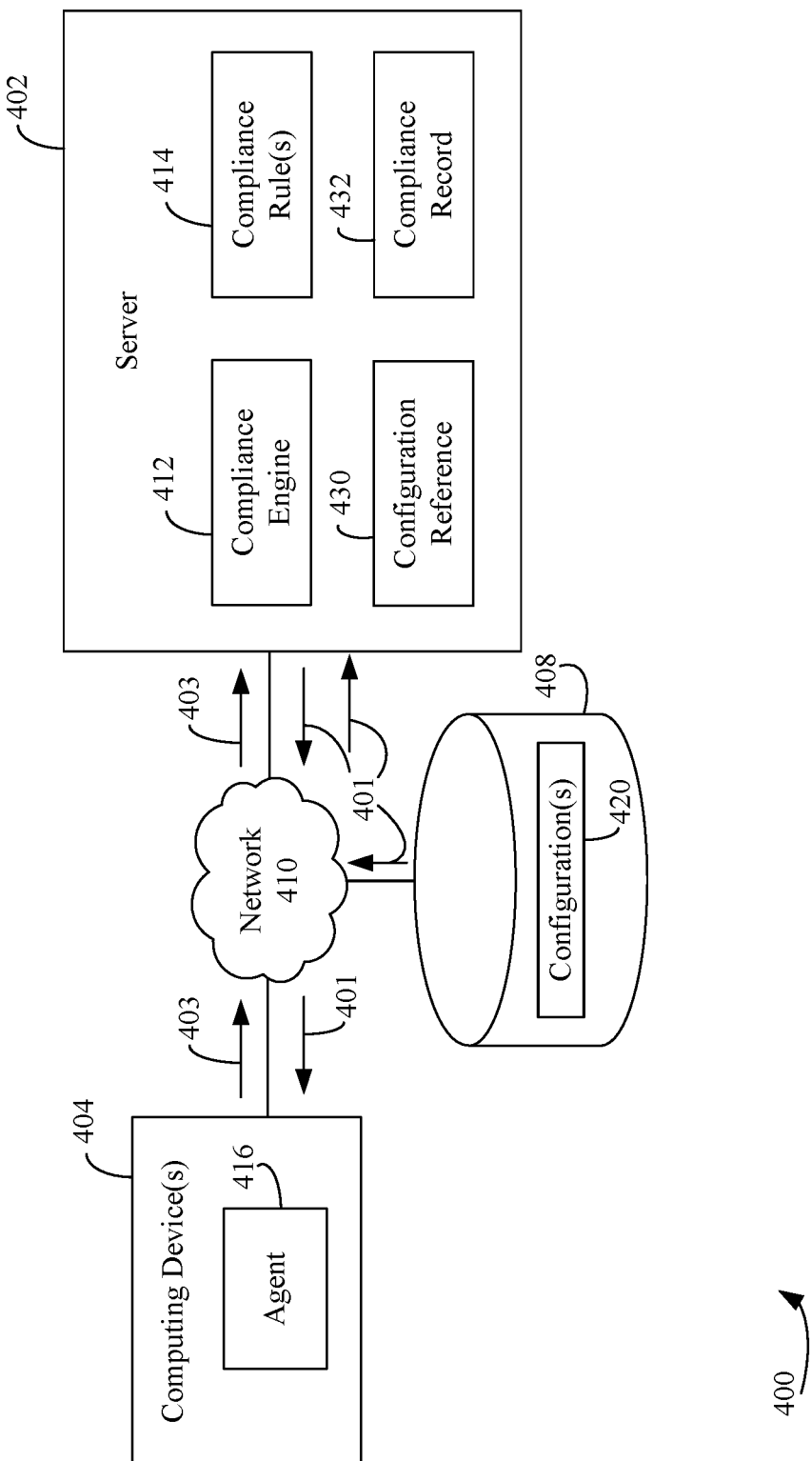
FIG. 4 depicts a block diagram of a system for managing device compliance in accordance with an example embodiment.

Accordingly, a device may be managed for compliance in many ways. For example, FIG. 3 depicts a flowchart 300 of an example method implemented by a server for managing device compliance in accordance with an example embodiment. The method of flowchart 300 will now be described with reference to system 400 of FIG. 4, although the method is not limited to that implementation. FIG. 4 is a block diagram for system 400 for managing device compliance in accordance with another embodiment. As shown in FIG. 4, system 400 includes a server 402, one or more computing devices 404, and one or more data stores 408. Server 402, computing device(s) 404, and data store(s) 408 are communicatively coupled via an enterprise network 410. Server 402, computing device(s) 404, data store(s) 408, and enterprise network 410 are examples of server 202, computing device(s) 204, data store(s) 208, and enterprise network 210 as described above with reference to FIG. 2. As further shown in FIG. 4, server 402 comprises a compliance engine 412, one or more compliance rules 414, a configuration reference 430, and a compliance record 432. Computing device(s) 404 each comprise an agent 416, and data store(s) 408 comprise configuration(s) 420. Compliance engine 412, compliance rule(s) 414, configuration reference 430, compliance record 432, and agent 416 are examples of compliance engine 212, compliance rule(s) 214, configuration reference 230, compliance record 232, and agent 216, as respectively described above with reference to FIG. 2. Configuration(s) 420 are examples of device configuration(s) 222, security baseline(s) 224, OEM configuration(s) 226, and/or third-party configuration(s) 228, as described above with reference to FIG. 2. Other structural and operational embodiments will be apparent to persons skilled in the relevant art(s) based on the discussion regarding flowchart 300 and system 400 of FIG. 4.

As shown in FIG. 3, the method of flowchart 300 begins at step 302, in which a configuration setting for a computing device accessible via a network that communicatively couples the server and the computing device is determined. For example, with reference to FIG. 4, server 402 determines a configuration setting for computing device(s) 404, which is accessible via enterprise network 410.

In accordance with one or more embodiments, the configuration setting specifies at least one of an encryption setting to be implemented by the computing device, a security setting to be implemented by the computing device, or a minimum version of at least one of an application or an operating system required to be installed on the computing device.

In accordance with one or more embodiments, the configuration setting for the computing device is determined by identifying a user that has logged into the computing device and determining a configuration setting associated with the user and the computing device. For example, an administrator of the enterprise may configure configuration settings differently for each computing device of computing device(s) 404 and/or for each user of a particular computing device of computing device(s) 404. The administrator may ensure that such settings are in compliance with compliance rule(s) 414 associated therewith. Such configuration settings may be stored as configuration(s) 420 in data store(s) 408. When a user first logs into a computing device newly provisioned thereto, server 402 may determine a configuration from data store(s) 408 associated with that computing device and user (i.e., the user-device pair) and retrieve the configuration (shown as configuration 401).

At step 304, the configuration setting is transmitted to the computing device via the network. For example, with reference to FIG. 4, server 402 transmits configuration 401 to computing device(s) 404 via network 410.

At step 306, a reference to the configuration setting is maintained on the server. For example, with reference to FIG. 4, server 402 maintains a local configuration reference 430 of the configuration (i.e., configuration 401) transmitted to computing device(s) 404. Reference 430 may comprise a data structure (e.g., table) that maps the configurations setting(s) provided to a particular user-device pair. For example, the data structure may specify which configuration setting(s) have been provided and are to be implemented by a particular user-device pair.

At step 308, an acknowledgment that the configuration setting has been implemented is received via the network from the computing device. For example, with reference to FIG. 4, agent 416 sends an acknowledgment 403 to server 402 via enterprise network 410. Acknowledgment 403 indicates that agent 416 has implemented the configuration settings specified by configuration 401 on computing device(s) 404.

At step 310, the computing device is designated as being in compliance with a compliance rule responsive to receiving the acknowledgment. For example, with reference to FIG. 4, compliance engine 412 may update an entry compliance record 432 corresponding to computing device(s) 404 to indicate that computing device(s) 404 are complaint.

Figure 5:
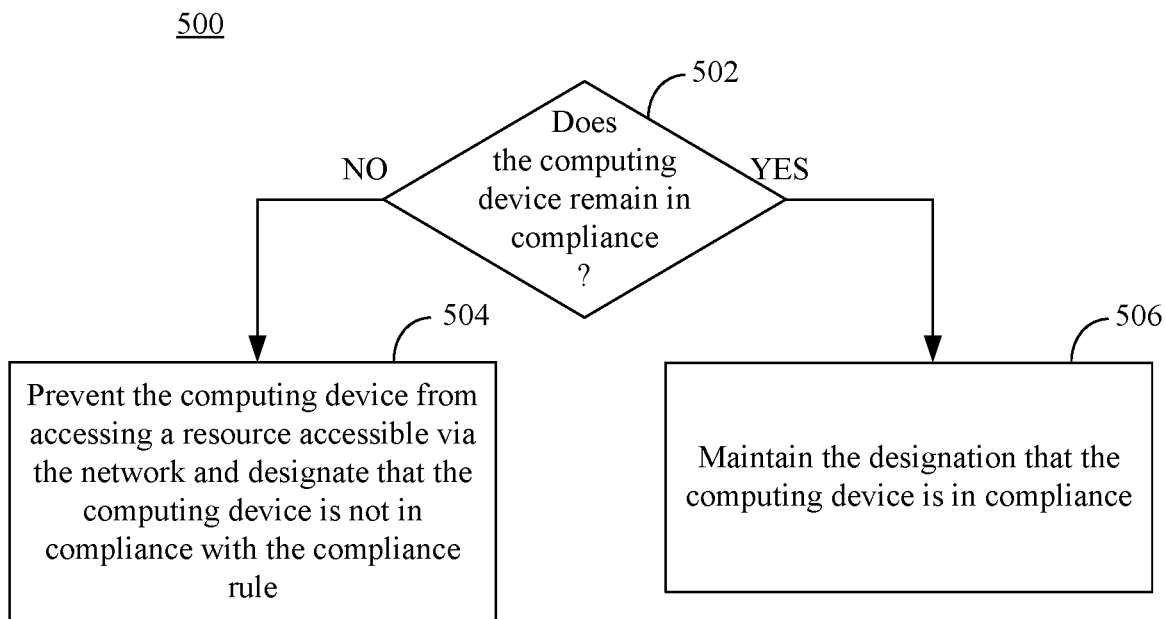
FIG. 5 depicts a flowchart of an example method for determining whether a computing device remains in compliance with compliance rule(s) in accordance with an example embodiment.
Figure 6:
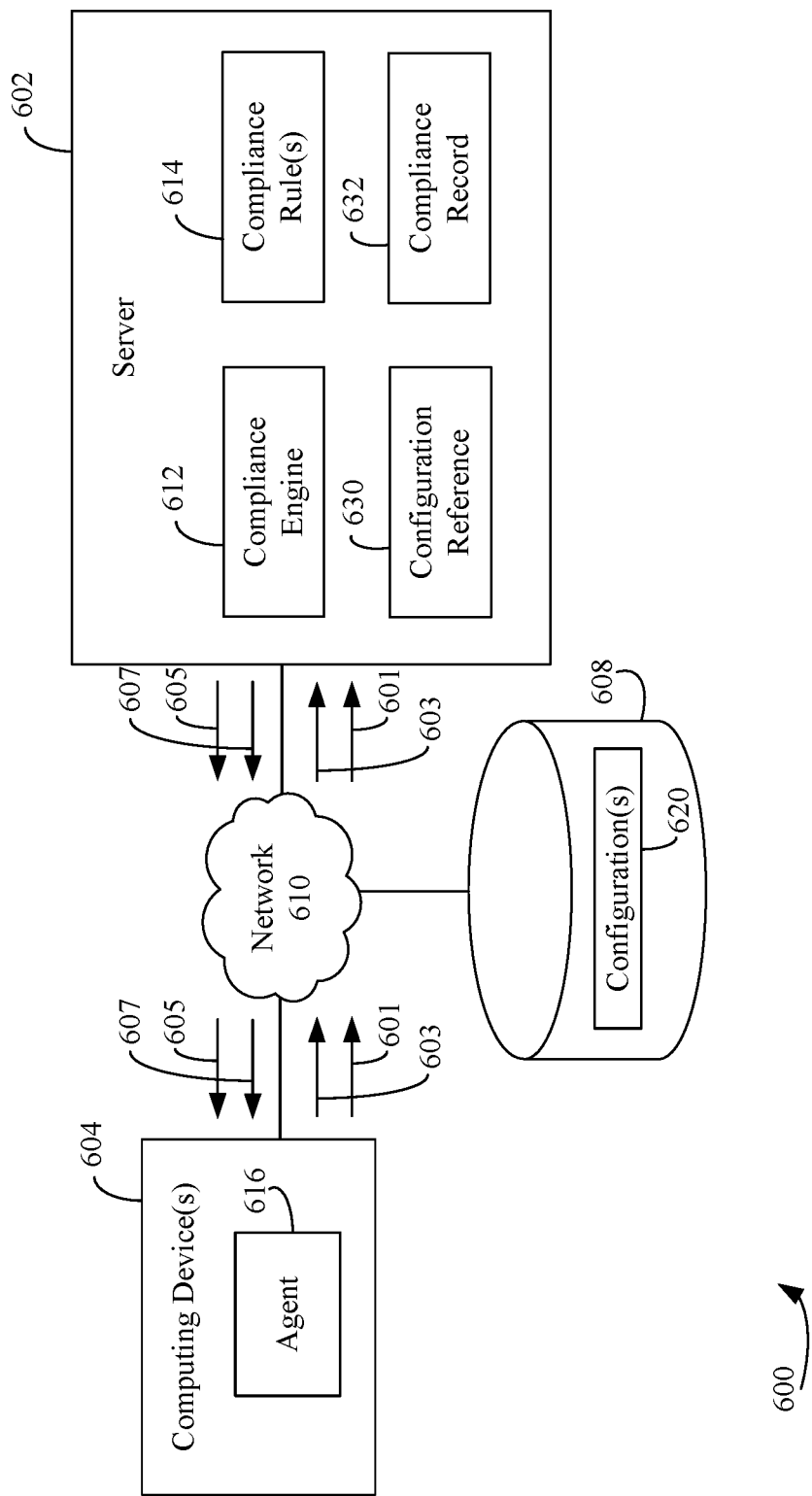
FIG. 6 depicts a block diagram of a system for determining whether a computing device remains in compliance with compliance rule(s) in accordance with an embodiment.

FIG. 5 depicts a flowchart 500 of an example method for determining whether a computing device remains in compliance with compliance rule(s) in accordance with an example embodiment. The method of flowchart 500 will now be described with reference to system 600 of FIG. 6, although the method is not limited to that implementation. FIG. 6 is a block diagram for system 600 for determining whether a computing device remains in compliance with compliance rule(s) in accordance with an embodiment. As shown in FIG. 6, system 600 includes a server 602, one or more computing devices 604, and one or more data stores 608. Server 602, computing device(s) 604, and data store(s) 608 are communicatively coupled via an enterprise network 610. Server 602, computing device(s) 604, data store(s) 608, and enterprise network 610 are examples of server 402, computing device(s) 404, data store(s) 408, and enterprise network 410, as described above with reference to FIG. 4. As further shown in FIG. 6, server 602 comprises a compliance engine 612, one or more compliance rules 614, a configuration reference 630, and a compliance record 632. Computing device(s) 604 comprise an agent 616, and data store(s) 608 comprise configuration(s) 620. Compliance engine 612, compliance rule(s) 614, configuration reference 630, and compliance record 632, and agent 616 are examples of compliance engine 412, compliance rule(s) 414, configuration reference 430, and compliance record 432, and agent 416, as respectively described above with reference to FIG. 4. Configuration(s) 620 are examples of configuration(s) 420, as described above with reference to FIG. 4. Other structural and operational embodiments will be apparent to persons skilled in the relevant art(s) based on the discussion regarding flowchart 500 and system 600 of FIG. 6.

As shown in FIG. 5, the method of flowchart 500 begins at step 502, in which a determination is made as to whether the computing device remains in compliance with the compliance rule by comparing the reference to the configuration setting to the compliance rule responsive to detecting a triggering event. For example, with reference to FIG. 6, compliance engine 612 determines whether computing device(s) 604 remain in compliance with compliance rule(s) 614 by comparing configuration reference 230 to compliance rule(s) 214 in response to detecting a triggering event. In response to determining that the computing device is no longer in compliance, flow continues to step 504. Otherwise, flow continues to step 506.

In accordance with one or more embodiments, the triggering event comprises at least one of an expiration of a predetermined time period, an indication received from the computing device that a second configuration setting of the computing device has changed, or an indication that a user has logged into the computing device. For example, with reference to FIG. 6, compliance engine 612 may maintain a timer, which, when expires, cause compliance engine 612 to compare the configuration setting(s) of computing device(s) 604, as indicated by configuration reference(s) 606, to compliance rule(s) 614. In another example, agent 616 may provide an indication 601 to compliance engine 612 via network 610 that indicates that a second configuration setting of computing device(s) 604 has changed. In another example, a particular computing device of computing device(s) 604 may provide an indication 603 that a user has logged onto network 610 and/or the computing device to server 602 via enterprise network 610.

At step 504, the computing device is prevented from accessing a resource accessible via the network, and the computing device is designated as not being in compliance with the compliance rule. For example, with reference to FIG. 6, compliance engine 612 prevents computing device(s) 604 from accessing a resource accessible via enterprise network 610 and designates computing device(s) 604 as not being in compliance with compliance rule(s) 614. For instance, compliance engine 612 may transmit a command 607 to computing device(s) 604 that disables access to enterprise network 610 resources. Compliance engine 612 also update an entry in compliance record 632 corresponding to computing device(s) 604 to indicate that computing device(s) 604 are no longer compliant.

In accordance with one or more embodiments, a new configuration setting that is in compliance with the compliance rule is transmitted to the computing device via the network in response to determining that the computing device is no longer in compliance. For example, with reference to FIG. 6, an administrator may update configuration(s) 420 such that they are in compliance with compliance rule(s) 414. Compliance engine 612 may retrieve the updated configuration(s) and/or transmit the updated configuration(s) (shown as configuration 405) to agent 616 via enterprise network 610, which implements the new configuration settings specified thereby.

At step 506, the designation that the computing device is in compliance is maintained. For example, with reference to FIG. 6, compliance engine 612 maintains the designation in compliance record 632 that computing device(s) 604 are in compliance with compliance rule(s) 614.

III. Example Mobile and Stationary Device Embodiments

The systems and methods described above, including the device compliance management embodiments described in reference to FIGS. 1-6, may be implemented in hardware, or hardware combined with one or both of software and/or firmware. For example, compliance engine 112, agent 116, compliance engine 212, compliance rule(s) 214, configuration reference 230, compliance record 232, agent 216, compliance engine 412, compliance rule(s) 414, configuration reference 430, compliance record 432, agent 416, and/or each of the components described therein, and flowchart 300 and/or flowchart 500 be each implemented as computer program code/instructions configured to be executed in one or more processors and stored in a computer readable storage medium. Alternatively, compliance engine 112, agent 116, compliance engine 212, compliance rule(s) 214, configuration reference 230, compliance record 232, agent 216, compliance engine 412, compliance rule(s) 414, configuration reference 430, compliance record 432, agent 416, and/or each of the components described therein, and flowchart 300 and/or flowchart 500 may be implemented as hardware logic/electrical circuitry. In an embodiment, compliance engine 112, agent 116, compliance engine 212, compliance rule(s) 214, configuration reference 230, compliance record 232, agent 216, compliance engine 412, compliance rule(s) 414, configuration reference 430, compliance record 432, agent 416, and/or each of the components described therein, and flowchart 300 and/or flowchart 500 may be implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 7:
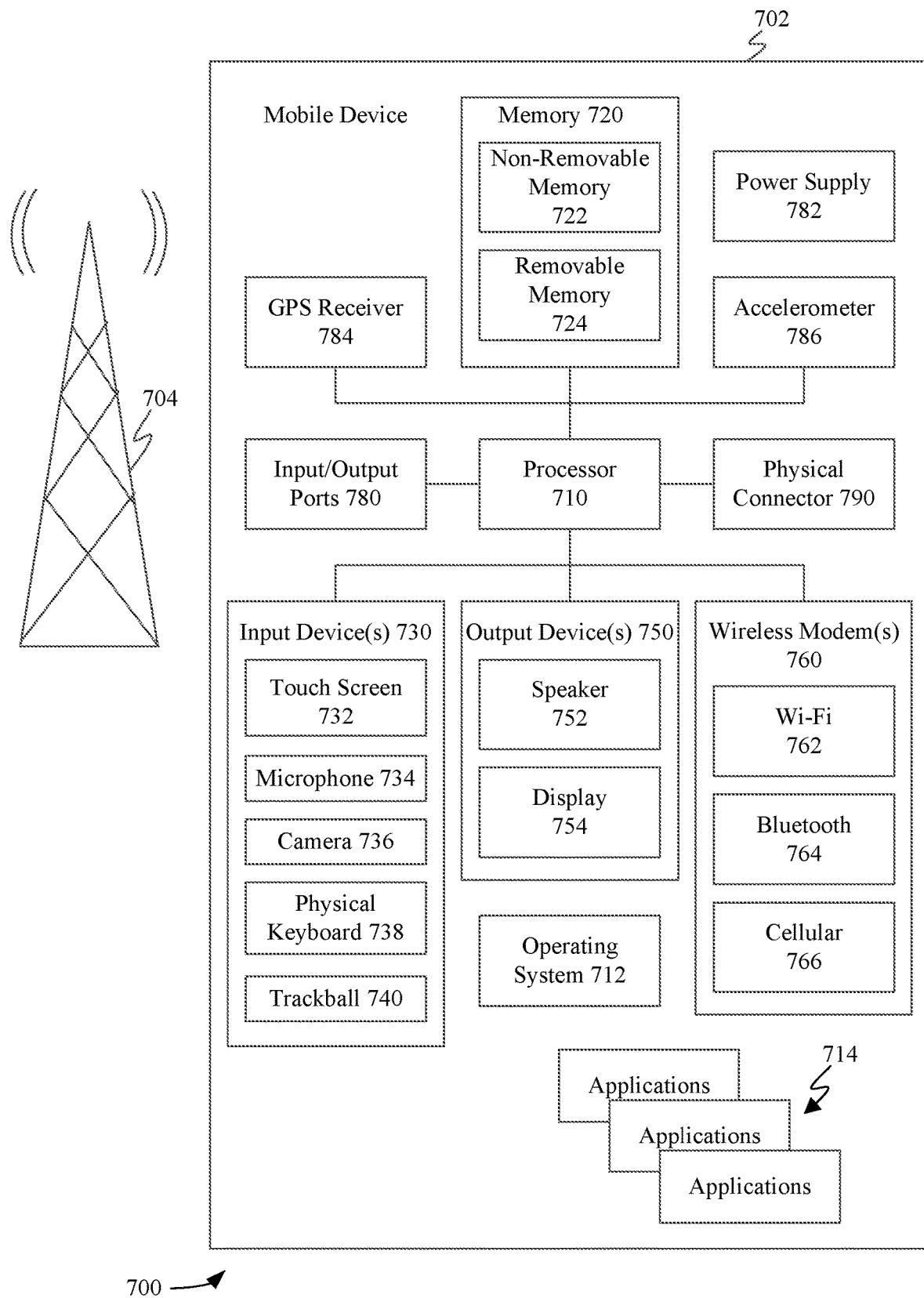
FIG. 7 is a block diagram of an exemplary user device in which embodiments may be implemented.

FIG. 7 shows a block diagram of an exemplary mobile device 700 including a variety of optional hardware and software components, shown generally as components 702. Any number and combination of the features/elements of computing device(s) 104, computing device(s) 204, third party computing device(s) 218, IoT device(s) 220, computing device(s) 404, computing device(s) 604, server 102, server 402, server 602, compliance engine 112, agent 116, compliance engine 212, compliance rule(s) 214, configuration reference 230, compliance record 232, agent 216, compliance engine 412, compliance rule(s) 414, configuration reference 430, compliance record 432, agent 416, and/or each of the components described therein, and flowchart 300 and/or flowchart 500 may be implemented as components 702 included in a mobile device embodiment, as well as additional and/or alternative features/elements, as would be known to persons skilled in the relevant art(s). It is noted that any of components 702 can communicate with any other of components 702, although not all connections are shown, for ease of illustration. Mobile device 700 can be any of a variety of mobile devices described or mentioned elsewhere herein or otherwise known (e.g., cell phone, smartphone, handheld computer, Personal Digital Assistant (PDA), etc.) and can allow wireless two-way communications with one or more mobile devices over one or more communications networks 704, such as a cellular or satellite network, or with a local area or wide area network.

The illustrated mobile device 700 can include a controller or processor referred to as processor circuit 710 for performing such tasks as signal coding, image processing, data processing, input/output processing, power control, and/or other functions. Processor circuit 710 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 710 may execute program code stored in a computer readable medium, such as program code of one or more applications 714, operating system 712, any program code stored in memory 720, etc. Operating system 712 can control the allocation and usage of the components 702 and support for one or more application programs 714 (a.k.a. applications, "apps", etc.). Application programs 714 can include common mobile computing applications (e.g., email applications, calendars, contact managers, web browsers, messaging applications) and any other computing applications (e.g., word processing applications, mapping applications, media player applications).

As illustrated, mobile device 700 can include memory 720. Memory 720 can include non-removable memory 722 and/or removable memory 724. The non-removable memory 722 can include RAM, ROM, flash memory, a hard disk, or other well-known memory storage technologies. The removable memory 724 can include flash memory or a Subscriber Identity Module (SIM) card, which is well known in GSM communication systems, or other well-known memory storage technologies, such as "smart cards." The memory 720 can be used for storing data and/or code for running operating system 712 and applications 714. Example data can include web pages, text, images, sound files, video data, or other data sets to be sent to and/or received from one or more network servers or other devices via one or more wired or wireless networks. Memory 720 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 720. These programs include operating system 712, one or more application programs 714, and other program modules and program data. Examples of such application programs or program modules may include, for example, computer program logic (e.g., computer program code or instructions) for implementing the systems described above, including the device compliance management embodiments described in reference to FIGS. 1-6.

Mobile device 700 can support one or more input devices 730, such as a touch screen 732, microphone 734, camera 736, physical keyboard 738 and/or trackball 740 and one or more output devices 750, such as a speaker 752 and a display 754.

Other possible output devices (not shown) can include piezoelectric or other haptic output devices. Some devices can serve more than one input/output function. For example, touch screen 732 and display 754 can be combined in a single input/output device. The input devices 730 can include a Natural User Interface (NUI).

Wireless modem(s) 760 can be coupled to antenna(s) (not shown) and can support two-way communications between processor circuit 710 and external devices, as is well understood in the art. The modem(s) 760 are shown generically and can include a cellular modem 766 for communicating with the mobile communication network 704 and/or other radio-based modems (e.g., Bluetooth 764 and/or Wi-Fi 762). Cellular modem 766 may be configured to enable phone calls (and optionally transmit data) according to any suitable communication standard or technology, such as GSM, 3G, 4G, 5G, etc. At least one of the wireless modem(s) 760 is typically configured for communication with one or more cellular networks, such as a GSM network for data and voice communications within a single cellular network, between cellular networks, or between the mobile device and a public switched telephone network (PSTN).

Mobile device 700 can further include at least one input/output port 780, a power supply 782, a satellite navigation system receiver 784, such as a Global Positioning System (GPS) receiver, an accelerometer 786, and/or a physical connector 790, which can be a USB port, IEEE 1394 (FireWire) port, and/or RS-232 port. The illustrated components 702 are not required or all-inclusive, as any components can be not present and other components can be additionally present as would be recognized by one skilled in the art.

Figure 8:
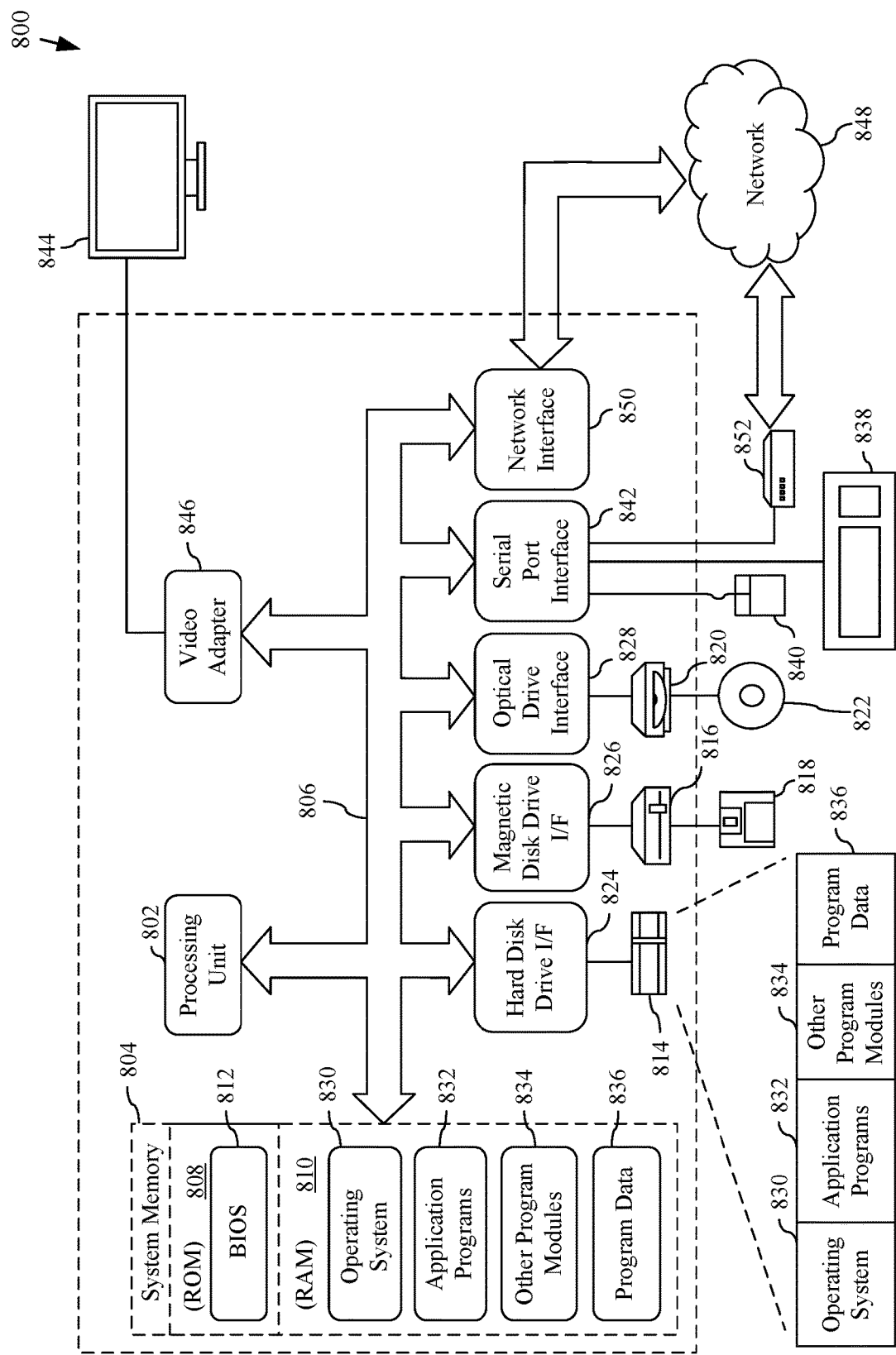
FIG. 8 is a block diagram of an example computing device that may be used to implement embodiments.

Furthermore, FIG. 8 depicts an exemplary implementation of a computing device 800 in which embodiments may be implemented, including computing device(s) 104, computing device(s) 204, third party computing device(s) 218, IoT device(s) 220, computing device(s) 404, computing device(s) 604, server 102, server 402, server 602, compliance engine 112, agent 116, compliance engine 212, compliance rule(s) 214, configuration reference 230, compliance record 232, agent 216, compliance engine 412, compliance rule(s) 414, configuration reference 430, compliance record 432, agent 416, and/or each of the components described therein, and flowchart 300 and/or flowchart 500. The description of computing device 800 provided herein is provided for purposes of illustration, and is not intended to be limiting. Embodiments may be implemented in further types of computer systems, as would be known to persons skilled in the relevant art(s).

As shown in FIG. 8, computing device 800 includes one or more processors, referred to as processor circuit 802, a system memory 804, and a bus 806 that couples various system components including system memory 804 to processor circuit 802. Processor circuit 802 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 802 may execute program code stored in a computer readable medium, such as program code of operating system 830, application programs 832, other programs 834, etc. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

Computing device 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 830, one or more application programs 832, other programs 834, and program data 836. Application programs 832 or other programs 834 may include, for example, computer program logic (e.g., computer program code or instructions) for implementing the systems described above, including the device compliance management embodiments described in reference to FIGS. 1-6.

A user may enter commands and information into the computing device 800 through input devices such as keyboard 838 and pointing device 840. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 802 through a serial port interface 842 that is coupled to bus 806, but may be connected by other interfaces, such as a parallel port, game port, or a universal serial bus (USB).

A display screen 844 is also connected to bus 806 via an interface, such as a video adapter 846. Display screen 844 may be external to, or incorporated in computing device 800. Display screen 844 may display information, as well as being a user interface for receiving user commands and/or other information (e.g., by touch, finger gestures, virtual keyboard, etc.). In addition to display screen 844, computing device 800 may include other peripheral output devices (not shown) such as speakers and printers.

Computing device 800 is connected to a network 848 (e.g., the Internet) through an adaptor or network interface 850, a modem 852, or other means for establishing communications over the network. Modem 852, which may be internal or external, may be connected to bus 806 via serial port interface 842, as shown in FIG. 8, or may be connected to bus 806 using another interface type, including a parallel interface.

As used herein, the terms "computer program medium," "computer-readable medium," and "computer-readable storage medium" are used to generally refer to physical hardware media such as the hard disk associated with hard disk drive 814, removable magnetic disk 818, removable optical disk 822, other physical hardware media such as RAMs, ROMs, flash memory cards, digital video disks, zip disks, MEMs, nanotechnology-based storage devices, and further types of physical/tangible hardware storage media (including system memory 804 of FIG. 8). Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 832 and other programs 834) may be stored on the hard disk, magnetic disk, optical disk, ROM, RAM, or other hardware storage medium. Such computer programs may also be received via network interface 850, serial port interface 852, or any other interface type. Such computer programs, when executed or loaded by an application, enable computing device 800 to implement features of embodiments discussed herein. Accordingly, such computer programs represent controllers of the computing device 800.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Exemplary Embodiments

A method implemented by a server is described herein. The method includes determining a configuration setting for a computing device accessible via a network that communicatively couples the server and the computing device; transmitting, via the network, the configuration setting to the computing device; maintaining a reference to the configuration setting on the server; receiving, via the network, an acknowledgment from the computing device that the configuration setting has been implemented thereby; and designating the computing device as being in compliance with a compliance responsive to receiving the acknowledgment.

In an embodiment of the method, the method further comprises: determining whether the computing device remains in compliance with the compliance rule by comparing the reference to the configuration setting to the compliance rule responsive to detecting a triggering event; preventing the computing device from accessing a resource accessible via the network and designating that the computing device as not in compliance with the compliance rule in response to determining that the computing device is no longer in compliance; and maintaining the designation that the computing device is in compliance in response to determining that the computing device remains in compliance.

In an embodiment of the method, the resource comprises at least one of: an email server accessible via the network; a data repository accessible via the network; or an application server accessible via the network.

In an embodiment of the method, the method further comprises: transmitting, via the network, a new configuration setting that is in compliance with the compliance rule to the computing device in response to determining that the computing device is no longer in compliance.

In an embodiment of the method, the triggering event comprises at least one of: an expiration of a predetermined time period; an indication received from the computing device that a second configuration setting of the computing device has changed; or an indication that a user has logged into the computing device.

In an embodiment of the method, the configuration setting specifies at least one of: an encryption setting to be implemented by the computing device; a security setting to be implemented by the computing device; or a minimum version of at least one of an application or an operating system required to be installed on the computing device.

In an embodiment of the method, determining the configuration setting for the computing device comprises: identifying a user that has logged into the computing device; and determining a configuration setting associated with the user and the computing device.

A server is also described herein. The server includes at least one processor circuit and at least one memory that stores program code configured to be executed by the at least one processor circuit, the program code comprising: a compliance engine configured to: determine a configuration setting for a computing device accessible via a network that communicatively couples the server and the computing device; transmit, via the network, the configuration setting to the computing device; maintain a reference to the configuration setting on the server; receive, via the network, an acknowledgment from the computing device that the configuration setting has been implemented thereby; and designate the computing device as being in compliance with a compliance rule responsive to receiving the acknowledgment.

In an embodiment of the server, the compliance engine is further configured to: determine whether the computing device remains in compliance with the compliance rule by comparing the reference to the configuration setting to the compliance rule responsive to detecting a triggering event; prevent the computing device from accessing a resource accessible via the network and designate that the computing device as not in compliance with the compliance rule in response to determining that the computing device is no longer in compliance; and maintain the designation that the computing device is in compliance in response to determining that the computing device remains in compliance.

In an embodiment of the server, the resource comprises at least one of: an email server accessible via the network; a data repository accessible via the network; or an application server accessible via the network.

In an embodiment of the server, the compliance engine is further configured to: transmit, via the network, a new configuration setting that is in compliance with the compliance rule to the computing device in response to determining that the computing device is no longer in compliance.

In an embodiment of the server, the triggering event comprises at least one of: an expiration of a predetermined time period; an indication received from the computing device that a second configuration setting of the computing device has changed; or an indication that a user has logged into the computing device.

In an embodiment of the server, the configuration setting specifies at least one of: an encryption setting to be implemented by the computing device; a security setting to be implemented by the computing device; or a minimum version of at least one of an application or an operating system required to be installed on the computing device.

In an embodiment of the server, the compliance engine is further configured to determine the configuration setting for the computing device comprises: identifying a user that has logged into the computing device; and determining a configuration setting associated with the user and the computing device.

A computer-readable storage medium having program instructions recorded thereon that, when executed by at least one processor, perform a method is further described herein. The method includes determining a configuration setting for a computing device accessible via a network that communicatively couples the server and the computing device; transmitting, via the network, the configuration setting to the computing device; maintaining a reference to the configuration setting on the server; receiving, via the network, an acknowledgment from the computing device that the configuration setting has been implemented thereby; and designating the computing device as being in compliance with a compliance rule responsive to receiving the acknowledgment.

In an embodiment of the computer-readable storage medium, the method further comprises: determining whether the computing device remains in compliance with the compliance rule by comparing the reference to the configuration setting to the compliance rule responsive to detecting a triggering event; preventing the computing device from accessing a resource accessible via the network and designating that the computing device as not in compliance with the compliance rule in response to determining that the computing device is no longer in compliance; and maintaining the designation that the computing device is in compliance in response to determining that the computing device remains in compliance.

In an embodiment of the computer-readable storage medium, the resource comprises at least one of: an email server accessible via the network; a data repository accessible via the network; or an application server accessible via the network.

In an embodiment of the computer-readable storage medium, the method further comprises: transmitting, via the network, a new configuration setting that is in compliance with the compliance rule to the computing device in response to determining that the computing device is no longer in compliance.

In an embodiment of the computer-readable storage medium, the triggering event comprises at least one of: an expiration of a predetermined time period; an indication received from the computing device that a second configuration setting of the computing device has changed; or an indication that a user has logged into the computing device.

In an embodiment of the computer-readable storage medium, the configuration setting specifies at least one of: an encryption setting to be implemented by the computing device; a security setting to be implemented by the computing device; or a minimum version of at least one of an application or an operating system required to be installed on the computing device.

In an embodiment of the computer-readable storage medium, determining the configuration setting for the computing device comprises: identifying a user that has logged into the computing device; and determining a configuration setting associated with the user and the computing device.

V. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A method implemented by a server, comprising:
receiving, from a computing device accessible via a network that communicatively couples the server and the computing device, a first notification indicating that a first user has logged into the computing device;
retrieving a first configuration setting, associated with the first user and the computing device, from a reference maintained by the server, the reference specifying that the computing device implements the first configuration setting when the first user logs into the computing device;
determining that the first configuration setting is not in compliance with a compliance rule; and
based on determining that the first configuration setting is not in compliance with the compliance rule,
designating the computing device as not in compliance with the compliance rule; and
transmitting, via the network, a second configuration setting to the computing device that, when implemented by the computing device, causes the computing device to be in compliance with the compliance rule.

2. The method of claim 1, further comprising:
responsive to designating the computing device as not in compliance with the compliance rule, preventing the computing device from accessing a resource accessible via the network until the computing device is in compliance.

3. The method of claim 2, wherein the resource comprises at least one of:
an email server accessible via the network;
a data repository accessible via the network; or
an application server accessible via the network.

4. The method of claim 1, further comprising receiving an indication from the computing device that a third configuration setting of the computing device has changed.

5. The method of claim 1, wherein the first configuration setting specifies at least one of:
   an encryption setting to be implemented by the computing device;
   a security setting to be implemented by the computing device; or
   a minimum version of at least one of an application or an operating system required to be installed on the computing device.

6. The method of claim 1, further comprising:
   receiving an acknowledgement from the computing device, the acknowledgment indicating that the computing device has implemented the second configurating setting; and
   responsive to receiving the acknowledgement, designating the computing device as being in compliance with the compliance rule.

7. The method of claim 1, further comprising:
   receiving, from the computing device, a second notification indicating that a second user has logged into the computing device;
   retrieving a third configuration setting, associated with the second user and the computing device, from the reference, the reference specifying that the computing device implements the third configuration setting when the second user logs into the computing device;
   determining that the third configuration setting is in compliance with the compliance rule; and
   in response to determining that the third configuration setting is in compliance with the compliance rule, designating the computing device as being in compliance with the compliance rule.

8. A server, comprising:
   at least one processor circuit; and
   at least one memory that stores program code configured to be executed by the at least one processor circuit, the program code comprising:
      a compliance engine configured to:
         receive, from a computing device accessible via a network that communicatively couples the server and the computing device, a first notification indicating that a first user has logged into the computing device;
         retrieve a first configuration setting, associated with the first user and the computing device, from a reference maintained by the server, the reference specifying that the computing device implements the first configuration setting when the first user logs into the computing device;
         determine that the first configuration setting is not in compliance with a compliance rule; and
         based on determining that the first configuration setting is not in compliance with the compliance rule,
            designate the computing device as not in compliance with the compliance rule; and
            transmit, via the network, a second configuration setting to the computing device that, when implemented by the computing device, causes the computing device to be in compliance with the compliance rule.

9. The server of claim 8, wherein the compliance engine is further configured to:
   responsive to designating the computing device as not in compliance with the compliance rule, prevent the computing device from accessing a resource accessible via the network until the computing device is in compliance.

10. The server of claim 9, wherein the resource comprises at least one of:
    an email server accessible via the network;
    a data repository accessible via the network; or
    an application server accessible via the network.

11. The server of claim 8, wherein the compliance engine is further configured to receive an indication from the computing device that a third configuration setting of the computing device has changed.

12. The server of claim 8, wherein the first configuration setting specifies at least one of:
    an encryption setting to be implemented by the computing device;
    a security setting to be implemented by the computing device; or
    a minimum version of at least one of an application or an operating system required to be installed on the computing device.

13. The server of claim 8, wherein the compliance engine is further configured to:
    receive an acknowledgement from the computing device, the acknowledgment indicating that the computing device has implemented the second configurating setting; and
    responsive to receiving the acknowledgement, designate the computing device as being in compliance with the compliance rule.

14. The server of claim 8, wherein the compliance engine is further configured to:
    receive, from the computing device, a second notification indicating that a second user has logged into the computing device;
    retrieve a third configuration setting, associated with the second user and the computing device, from the reference, the reference specifying that the computing device implements the third configuration setting when the second user logs into the computing device;
    determine that the third configuration setting is in compliance with the compliance rule; and
    in response to determining that the third configuration setting is in compliance with the compliance rule, designate the computing device as being in compliance with the compliance rule.

15. A computer-readable storage medium having program instructions recorded thereon that, when executed by at least one processor of a server, perform a method, the method comprising:
    receiving, from a computing device accessible via a network that communicatively couples the server and the computing device, a first notification indicating that a first user has logged into the computing device;
    retrieving a first configuration setting, associated with the first user and the computing device, from a reference maintained by the server, the reference specifying that the computing device implements the first configuration setting when the first user logs into the computing device;
    determining that the first configuration setting is not in compliance with a compliance rule; and based on determining that the first configuration setting is not in compliance with the compliance rule,
designating the computing device as not in compliance with the compliance rule; and
transmitting, via the network, a second configuration setting to the computing device that, when implemented by the computing device, causes the computing device to be in compliance with the compliance rule.

16. The computer-readable storage medium of claim 15, the method further comprising:
responsive to designating the computing device as not in compliance with the compliance rule, preventing the computing device from accessing a resource accessible via the network until the computing device is in compliance.

17. The computer-readable storage medium of claim 16, wherein the resource comprises at least one of:
an email server accessible via the network;
a data repository accessible via the network; or
an application server accessible via the network.

18. The computer-readable storage medium of claim 15, the method further comprising receiving an indication from the computing device that a third configuration setting of the computing device has changed.

19. The computer-readable storage medium of claim 15 wherein the first configuration setting specifies at least one of:
an encryption setting to be implemented by the computing device;
a security setting to be implemented by the computing device; or
a minimum version of at least one of an application or an operating system required to be installed on the computing device.

20. The computer-readable storage medium of claim 15, the method further comprising:
receiving an acknowledgement from the computing device, the acknowledgment indicating that the computing device has implemented the second configurating setting; and
responsive to receiving the acknowledgement, designating the computing device as being in compliance with the compliance rule.

* * * * *